US010902067B2

(12) United States Patent
Magnaghi et al.

(10) Patent No.: US 10,902,067 B2
(45) Date of Patent: Jan. 26, 2021

(54) SYSTEMS AND METHODS FOR PREDICTING REVENUE FOR WEB-BASED CONTENT

(71) Applicant: Demand Media, Inc., Santa Monica, CA (US)

(72) Inventors: Antonio Magnaghi, Los Angeles, CA (US); Jeremy Daw, Venice, CA (US); Jeong-Yoon Lee, Torrance, CA (US)

(73) Assignee: Leaf Group Ltd., Santa Monica, CA (US)

( * ) Notice: Subject to any disclaimer, the term of this patent is extended or adjusted under 35 U.S.C. 154(b) by 1200 days.

(21) Appl. No.: 13/869,826

(22) Filed: Apr. 24, 2013

(65) Prior Publication Data

US 2014/0324533 A1    Oct. 30, 2014

(51) Int. Cl.
| | | |
|---|---|---|
| *G06F 16/951* | (2019.01) | |
| *G06Q 30/02* | (2012.01) | |
| *G06F 16/215* | (2019.01) | |
| *G06F 16/23* | (2019.01) | |
| *G06F 16/2457* | (2019.01) | |
| *G06F 16/00* | (2019.01) | |

(52) U.S. Cl.
CPC ............ *G06F 16/951* (2019.01); *G06F 16/00* (2019.01); *G06F 16/215* (2019.01); *G06F 16/2365* (2019.01); *G06F 16/24578* (2019.01); *G06Q 30/0202* (2013.01)

(58) Field of Classification Search
CPC .......................... G06Q 30/0202; G06F 16/951
See application file for complete search history.

(56) References Cited

U.S. PATENT DOCUMENTS

| 5,974,412 A | 10/1999 | Hazlehurst et al. |
| 6,199,061 B1 | 3/2001 | Blewett et al. |
| (Continued) | | |

FOREIGN PATENT DOCUMENTS

KR    1020070095506    10/2007

OTHER PUBLICATIONS

International Patent Application Serial No. PCT/US2014/034341, International Preliminary Report on Patentability and Written Opinion, dated Aug. 14, 2014.

(Continued)

*Primary Examiner* — Andre D Boyce
(74) *Attorney, Agent, or Firm* — Greenberg Traurig

(57) ABSTRACT

Embodiments of the present disclosure help content providers maximize the profitability of the online content they produce by providing an accurate, inexpensive, and timely quantitative estimate of the revenue the content is likely to generate. Various embodiments can refine estimates based on real-time or near-real-time data in conjunction with historical pricing data, thereby further improving the accuracy of the revenue predictions. A computer-implemented method according to one embodiment of the present disclosure comprises receiving, by a computer system, information regarding a topic; identifying, by the computer system, a format for content associated with the topic; and determining a score indicative of predicted revenue generated from future content in the identified format associated with the topic, wherein determining the score is based on a revenue model under which revenue from the future content would be generated.

20 Claims, 4 Drawing Sheets

(56) References Cited

U.S. PATENT DOCUMENTS

| | | |
|---|---|---|
| 6,266,570 B1 | 7/2001 | Hocherl et al. |
| 7,131,065 B1 | 10/2006 | Kane |
| 7,222,078 B2 | 5/2007 | Abelow |
| 7,636,732 B1 | 12/2009 | Nielsen |
| 7,860,736 B2 | 12/2010 | Draper et al. |
| RE42,683 E | 9/2011 | Marcus |
| 8,037,063 B2 | 10/2011 | Oldham et al. |
| 8,041,596 B2 | 10/2011 | Graham et al. |
| 8,200,775 B2 | 6/2012 | Moore |
| 8,306,976 B2 | 11/2012 | Handman et al. |
| 8,341,179 B2 | 12/2012 | Zeinfeld |
| 8,369,500 B2 | 2/2013 | Krishnamoorthy et al. |
| 8,391,455 B2 | 3/2013 | Kelkar et al. |
| 8,417,581 B2 | 4/2013 | Ajjarapu et al. |
| 2002/0073019 A1 | 6/2002 | Deaton |
| 2004/0049499 A1 | 3/2004 | Nomoto et al. |
| 2005/0154746 A1 | 7/2005 | Liu et al. |
| 2006/0155656 A1 | 7/2006 | Kreder et al. |
| 2007/0005649 A1 | 1/2007 | Wang et al. |
| 2007/0027751 A1* | 2/2007 | Carson ............... G06F 17/2785 705/14.46 |
| 2007/0027845 A1 | 2/2007 | Dettinger |
| 2007/0083506 A1 | 4/2007 | Liddell et al. |
| 2007/0239534 A1* | 10/2007 | Liu ..................... G06Q 30/02 705/14.46 |
| 2007/0239542 A1 | 10/2007 | Shapiro |
| 2007/0266342 A1 | 11/2007 | Chang et al. |
| 2008/0104542 A1 | 5/2008 | Cohen et al. |
| 2008/0201251 A1 | 8/2008 | Magdon-Ismail et al. |
| 2008/0201348 A1* | 8/2008 | Edmonds ............... G06Q 30/02 |
| 2008/0313169 A1 | 12/2008 | Wolzien |
| 2009/0037421 A1 | 2/2009 | Gamble |
| 2009/0077124 A1 | 3/2009 | Spivack et al. |
| 2009/0089162 A1 | 4/2009 | Davis et al. |
| 2009/0119268 A1 | 5/2009 | Bandaru et al. |
| 2009/0248510 A1 | 10/2009 | Ahluwalia |
| 2009/0271228 A1* | 10/2009 | Bilenko ............... G06Q 30/02 705/7.29 |
| 2009/0327223 A1 | 12/2009 | Chakrabarti et al. |
| 2010/0049709 A1 | 2/2010 | Ravikumar et al. |
| 2010/0161613 A1* | 6/2010 | Rao ................... G06F 17/30616 707/741 |
| 2010/0211564 A1 | 8/2010 | Cohen et al. |
| 2010/0318484 A1 | 12/2010 | Huberman et al. |
| 2011/0093488 A1 | 4/2011 | Amacker et al. |
| 2011/0202821 A1* | 8/2011 | Roy .................... G06Q 30/02 715/201 |
| 2011/0270845 A1* | 11/2011 | Lin .................... G06F 17/30864 707/748 |
| 2011/0320444 A1 | 12/2011 | Yehaskel et al. |
| 2012/0041768 A1 | 2/2012 | Reese |
| 2012/0072435 A1 | 3/2012 | Han |
| 2012/0084155 A1* | 4/2012 | Roy .................... G06Q 30/0273 705/14.69 |
| 2012/0244995 A1 | 9/2012 | Dibenedetto |
| 2012/0259919 A1* | 10/2012 | Yan .................... G06Q 30/02 709/204 |
| 2012/0322041 A1 | 12/2012 | Weisman |
| 2013/0013581 A1 | 1/2013 | Pousti et al. |
| 2013/0013764 A1 | 1/2013 | Li et al. |
| 2013/0055097 A1 | 2/2013 | Oroca et al. |
| 2013/0073534 A1 | 3/2013 | Frech |
| 2014/0089124 A1* | 3/2014 | Jha .................... G06F 17/3089 705/26.3 |
| 2015/0178811 A1* | 6/2015 | Chen .................. G06Q 30/0631 705/26.7 |

OTHER PUBLICATIONS

International Patent Application Serial No. PCT/US2011/024875, International Search Report and Written Opinion, dated Sep. 30, 2011.

International Patent Application Serial No. PCT/US2011/042458, International Search Report and Written Opinion, dated Feb. 9, 2012.

Wikipedia, "Digg", accessed Dec. 11, 2009, http://en.wikipedia.org/wiki/Digg.

Yoon, Ju-Hyoung et al. "An Object Model of Korean Web Pages for Title Identification", 15th Annual Conference on Human and Cognitive Language Technology, 2003, 5 pages.

"Users' Benefit and Provider's Revenue of Content Delivery Services with Priority Control" Kyoko Yamori, Yoshiaki Tanaka, 2006, pp. 240-251, http://link.springer.com/chapter/10.1007%2F978-0-387-39229-5_20.

"An Adaptive Pricing Scheme for Content Delivery Systems" Srinivasan Jagannathan et al, 2002.

"Economy-based Content Replication for Peering Content Delivery Networks" Al-Mukaddim Kahn Pathan et al, 2006.

* cited by examiner

SYSTEMS AND METHODS FOR PREDICTING REVENUE FOR WEB-BASED CONTENT

CROSS-REFERENCE TO RELATED APPLICATIONS

This application is related to U.S. application Ser. No. 13/869,758, filed on Apr. 24, 2013, issued as U.S. Pat. No. 9,626,438 on Apr. 18, 2017 and entitled "SYSTEMS AND METHODS FOR DETERMINING CONTENT POPULARITY BASED ON SEARCHES," the content of which is incorporated by reference in its entirety.

BACKGROUND

Providers of web-based content on the Internet may receive revenue in a variety of different ways. For example, some providers sell content directly to users or other website providers based on the content accessed/downloaded or through a recurring subscription fee. Content providers may also receive income (directly or indirectly) from advertising revenues associated with their content, namely paid-placement advertising displayed in conjunction with the provider's content. Pricing models may be complex and can vary based on the type or format of the content, the number of times the content is accessed, the advertisers and websites involved, and other factors.

Accordingly, in deciding what content they will produce, and in what format(s), many content providers struggle to determine how much revenue they will receive for any given piece of content. As a result, many providers are note able to determine whether a particular piece of content will be successful until it is distributed. At that point, however, it is too late to avoid the costs associated with producing and distributing an unprofitable piece of content.

Embodiments of the present disclosure address these and other issues.

SUMMARY OF THE DESCRIPTION

Embodiments of the present disclosure help content providers maximize the profitability of the online content they produce by providing an accurate, inexpensive, and timely quantitative estimate of the revenue the content is likely to generate. Various embodiments can refine estimates based on real-time or near-real-time data in conjunction with historical pricing data, thereby further improving the accuracy of the revenue predictions.

A computer-implemented method according to one embodiment of the present disclosure comprises receiving, by a computer system, information regarding a topic; identifying, by the computer system, a format for content associated with the topic; and determining a score indicative of predicted revenue generated from future content in the identified format associated with the topic, wherein determining the score is based on a revenue model under which revenue from the future content would be generated.

The present disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

A more complete understanding of certain embodiments may be derived by referring to the detailed description and claims when considered in connection with the following illustrative figures.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Figure 1:
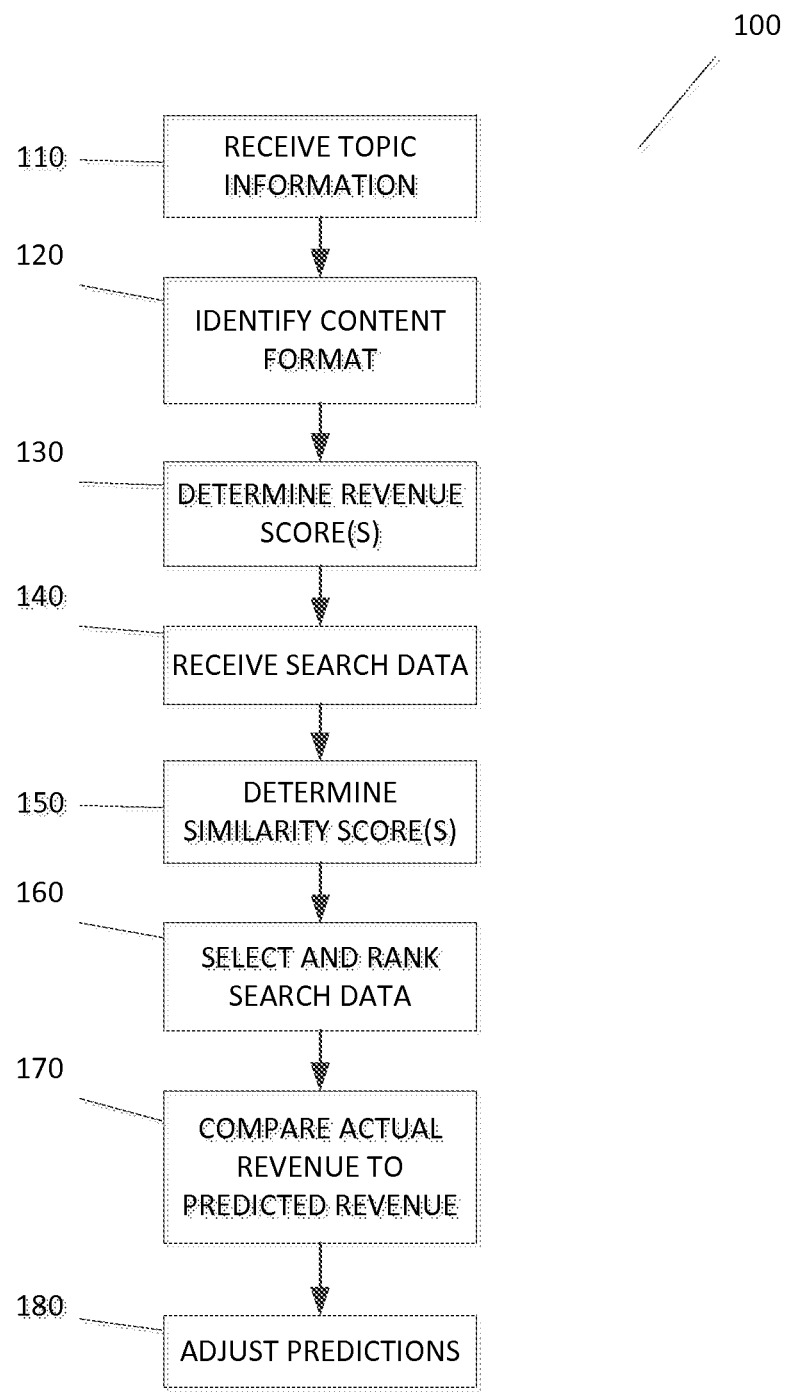
FIG. 1 is a flow diagram according to various embodiments.

FIG. 1 depicts an exemplary process according to various embodiments of the present disclosure. In FIG. 1, method 100 includes receiving information regarding a topic (110); identifying a format for content associated with the topic (120); determining one or more scores indicative of predicted revenue generated from future content in the identified format associated with the topic (130). The method 100 further includes receiving search data from previously-executed searches (140), determining one or more similarity scores indicative of a level of similarity between the topic and the search data (150); and selecting and ranking the search data (160). The method 100 further includes comparing the actual revenue generated by content to the previously predicted revenue (170); and adjusting future predictions based on the comparison (180). The steps of method 100 may be implemented (in whole or in part) by software operating on a computer system, such as the exemplary computer system 200 depicted in FIG. 2.

The topic may relate to existing content, as well as to future content. As used herein "future content" refers to any content that is yet to be created, as well as to existing content that may be provided, produced, distributed, hosted, or otherwise processed in a different manner. Embodiments of the present disclosure thus allow content providers to not only predict the revenue generated from new content, but to determine whether it would be beneficial to modify or redistribute existing content, or to provide content on different websites and/or under different revenue models.

Information regarding the topic may be received (110) from any desired source, such as from a content provider wishing to know the revenue that content associated with the topic is expected to generate. The topic may also be identified automatically based on web-crawling software analyzing content on websites over the Internet, and/or from data on searches performed by users looking for content.

Various formats for content associated with the topic may be identified (120) based on the information regarding the topic or from another indicator from a content provider, service provider managing embodiments of the present disclosure or other source. For example, a content provider may wish to know the difference in expected revenue for content for a topic produced in a first format (such as a video) compared to revenue generated from content in a second format (such as a textual article) for the same topic. Embodiments of the present disclosure may be used to predict the revenue generated from any desired content format, such as audio, video, text, images, and combinations thereof.

One or more scores are determined that are indicative of the predicted revenue generated from content to be provided, created, produced, and/or hosted in the future (130). For example, multiple scores can be determined for different formats of content that a content provider may produce. Additionally, different scores may be determined based on different websites on which the content could be hosted. Among other things, this allows content providers to compare and contrast different combinations of content topics, content formats, and hosting domains to help maximize the revenue they receive from their content, as well as to avoid spending the resources to produce content that is unlikely to be profitable.

Embodiments of the present disclosure may determine revenue scores based on any desired information and criteria. For example, a predicted revenue score may be based on information regarding revenue previously generated by other content. Such information may be collected and stored (e.g., in a database) by embodiments of the present disclosure. In one exemplary embodiment, the revenue score for content in a particular format that may be produced in the future by a provider is based on the historical revenue for existing content in the same format. Likewise, other embodiments may base a revenue score on revenue generated by other content on various distribution platforms from which future content from a provider may be provided, as well as based on the level of similarity between existing content and future content the provider may produce. As used herein, a "distribution platform" may include any system, software, network, or other entity from which content may be provided, such a software application (including mobile device applications), a file transfer protocol (FTP) site, a web site, a peer-to-peer network, and combinations thereof.

Different advertisers, distribution platforms (such as websites), and search engine providers may utilize different revenue models. Embodiments of the present disclosure may generate a predicted revenue score for future content based on the revenue model(s) that could be associated with the future content. For example, a first score may be generated for future content based on a first revenue model, and compared to a second score generated for the same content based on a second revenue model, allowing a content provider to quickly and easily identify the most lucrative revenue model for a particular piece of content. Any number of different revenue models may be analyzed in a similar manner.

Embodiments of the present invention may receive search data (140) for previously-executed searches from search engine providers or other sources, and determine a similarity score (150) indicative of the similarity between the search data and the topic. The search data may include any desired information regarding a search, including search terms entered by a user, information regarding a distribution platform providing content accessed by a user, information regarding content returned in response to search terms entered by a user (including the title of the content), information regarding content accessed by a user subsequent to a search, and combinations thereof.

Search data may include, for example, the average position of a search result returned in response to various searches; an indicator of the number of times a search result is accessed within a period of time (e.g., the number of "clicks" or selections the result receives per day); the cost associated with providing a search result in relation to the number of times the search result is accessed (e.g., the "cost per clicks"); information regarding a user accessing a search result (such as the user's age, sex, and other demographic information); information regarding a computing device used by the user accessing a search result (e.g., whether the device is a mobile device or a desktop, the operating system running on the device, hardware and software installed in the device, and other information); the age or length of time a particular piece of content has been provided (e.g., hosted at a particular website or websites); a ranking (e.g., ratings provided via social media sites) of content associated with a search result; revenue generated by content associated with a search result; and combinations thereof.

In various embodiments, a set of search data may include search terms entered into a search engine by a user, the results returned by the search engine in response to the entered search terms (e.g., websites and links to content thereon), and the link(s) within the search results that the user selects/accesses. Other information that may be included in the search data includes the amount of time a user spends viewing various content and/or the portions or amount of content a user actually accesses. For example, the search data may indicate that a user watches 30 seconds of a 5 minute video, and more particularly the first 30 seconds of the video before navigating away. In another example, the search data may note that a user spent 5 minutes reading a 10-page article, with four of the five minutes spent on the eighth page. Among other things, embodiments of the present disclosure can analyze information on the user's interaction with search results to provide additional accuracy with regards to the predicted revenue score.

The similarity score may be determined (150) in any suitable manner. For example, a topic or search terms of "how to wash my car" may be identified as similar to a topic or search terms of "how to wash my automobile." In one exemplary embodiment, a topic or search terms are parsed and analyzed using a part-of-speech tagger to identify nouns, verbs, adjectives, and other parts of the search terms. An exemplary part-of-speech tagger that may be used in conjunction with embodiments of the present disclosure is described at http://nlp.stanford.edu/software/tagger.shtml, the contents of which are incorporated herein by reference.

Additionally, topics or search terms can be further processed, via software, to identify the stems (i.e. root words without morphological affixes) of search terms, filter "stop words" (i.e., common words that are not utilized by a search engine), handle phrasal nouns, and other processing. An additional exemplary software package that may be used in conjunction with embodiments of the present disclosure to perform various processing of the search terms is the "Natural Language Toolkit" described at http://nltk.org, the contents of which are incorporated herein by reference.

Topics or search terms within the search data may also be processed to identify synonyms of words within the topic or search terms and to generate a score indicative of a level of similarity between the topics or search terms. In various embodiments, semantic ontologies (such as the WordNet lexical database described at http://wordnet.princeton.edu/, the contents of which are incorporated herein by reference) may be utilized to identify similarities between topics or search terms. In an exemplary embodiment utilizing the WordNet database, topics may be grouped into sets synonyms and values reflecting semantic and lexical similarities between two topics calculated. Table 1 (below) illustrates an exemplary comparison between two topics, and their associated groups of synonyms ("Synsets") and values reflecting the level of lexical or semantic similarities between the topics ("Sim Values"). In this example, the Sim Values are calculated based on the cosine distance between the feature vector representations of the titles.

TABLE 1

| | Topic 1<br>How to Make a Steely<br>Pan Drum Out of<br>Coffee<br>Cans | Topic 2<br>How to Make a Steel<br>Pan Drum Out of<br>Coffee Cans | Sim Value |
|---|---|---|---|
| Features<br>(Lex) | pan coffee drum can<br>steely | pan steel coffee drum<br>can | 0.66666 |
| Features<br>(Sem) | make pan coffee drum<br>can a out steely<br>Synset ('pan.n.01')<br>Synset ('coffee.n.01')<br>Synset ('can.n.01')<br>Synset ('drum.v.01') to<br>how of | make pan steel coffee<br>drum can a out<br>Synset ('pan.n.01')<br>Synset ('steel.n.01')<br>Synset ('coffee.n.01')<br>Synset ('can.n.01')<br>Synset ('drum.v.01')<br>to how of | 0.87894 |

Embodiments of the present disclosure can process search data for any number of previously-executed searches. In one exemplary embodiment, similarity scores for each of a plurality of received search data sets are calculated. Based on the similarity scores for each data set, a subset of the search data sets is selected and ranked (160). In this manner, search data that is most pertinent to the future content (e.g., similar topic, same content format, same or similar website domains, same or similar revenue model) can be selected and used to generate the predicted revenue score for the topic.

Embodiments of the present disclosure not only utilize historical information on web searches, and revenue performance for different content formats and website domains, but can improve the accuracy of the predicted revenue score over time by analyzing the actual revenue generated by a piece of content compared to its predicted revenue. In some embodiments, the providing, production, distribution, and/or hosting of future content can be tracked, and the actual revenue generated by the content monitored. This information can be stored (e.g., in a database) and retrieved to calculate various statistics, including the level of error between the predicted revenue and the actual revenue. Embodiments of the present disclosure may generate and transmit reports that include predicted revenue, actual revenue, and the error associated with the predicted revenue to any desired recipient, including a content provider.

Figure 3:
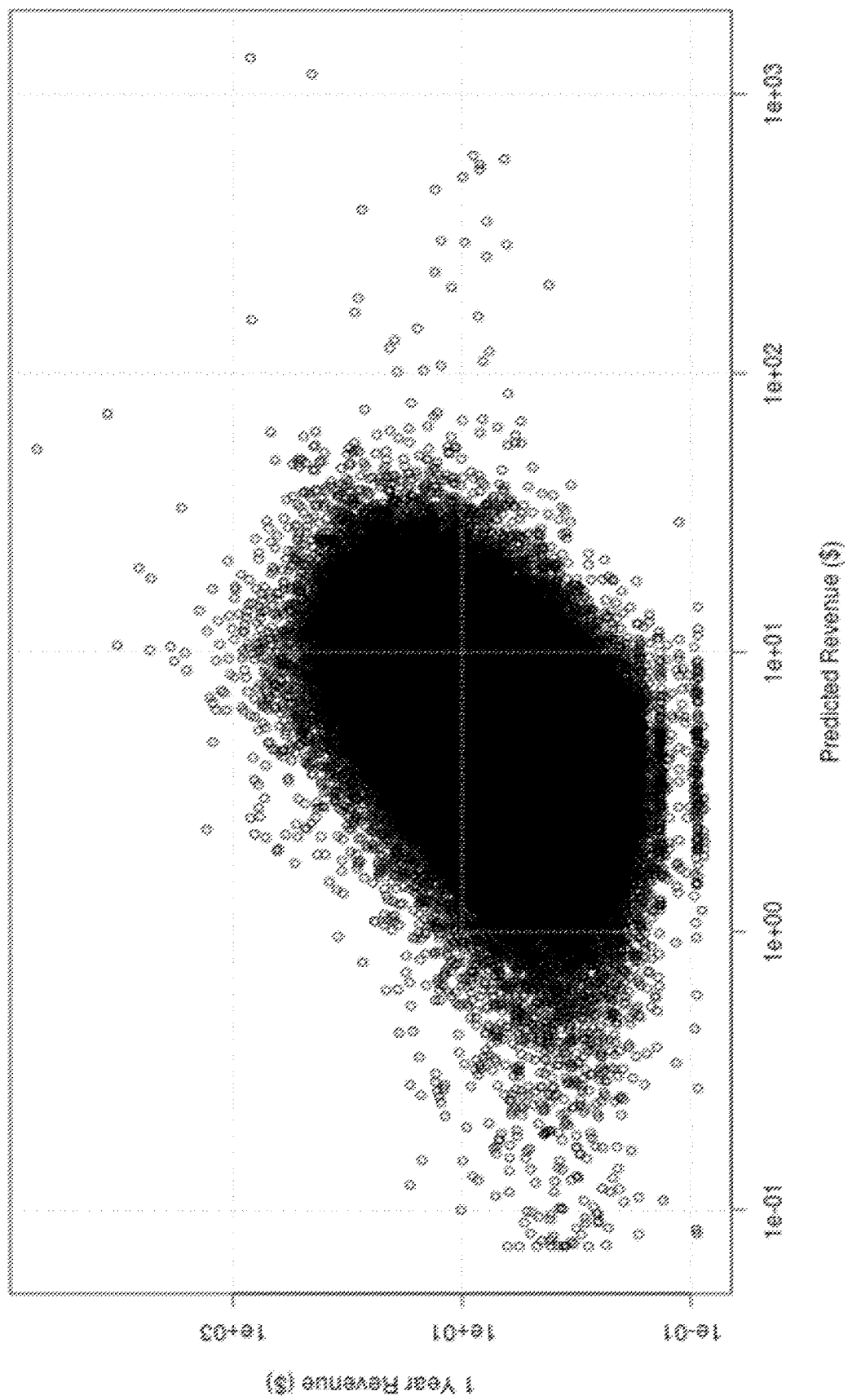
FIGS. 3 and 4 are exemplary graphs illustrating aspects of prediction error analysis according to various embodiments.
Figure 4:
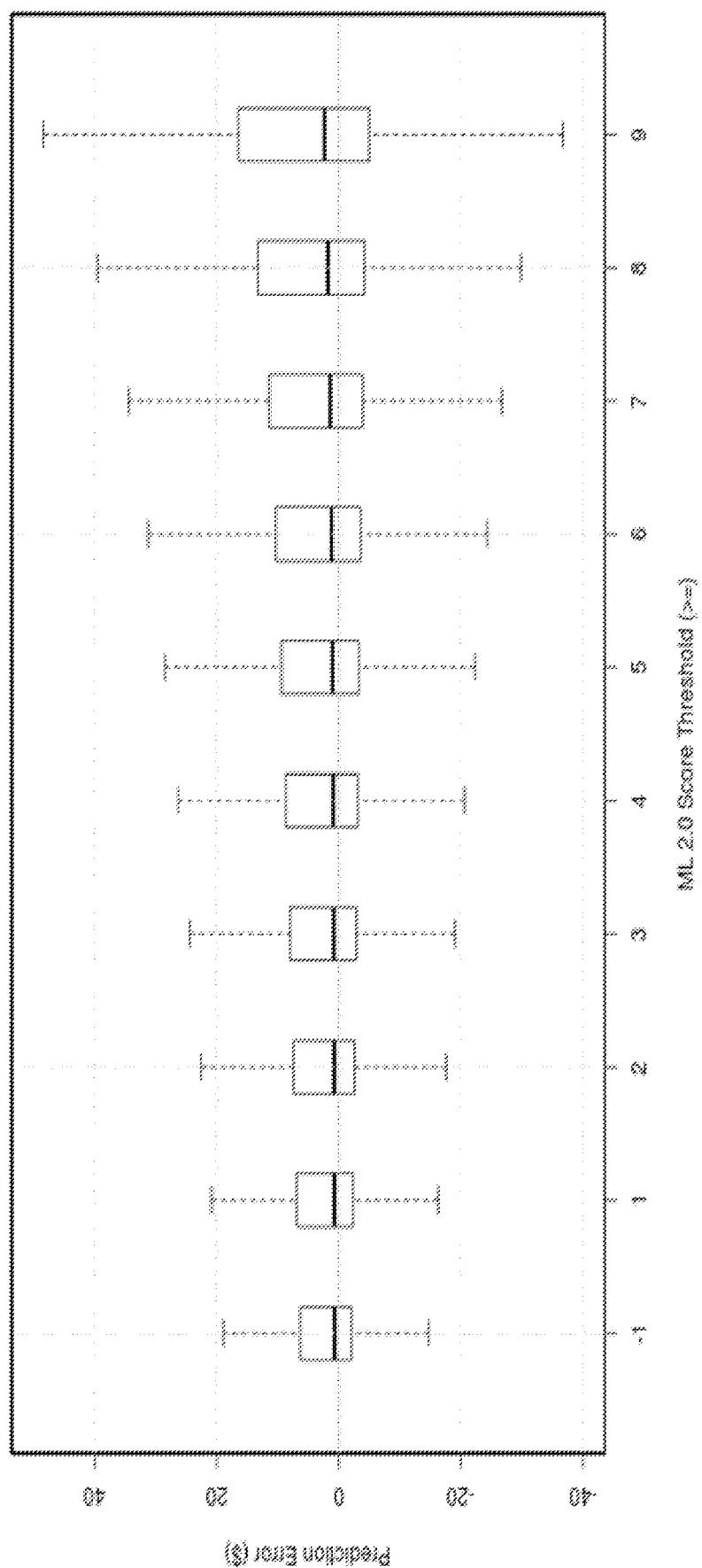

FIGS. 3 and 4 are representative of reports containing predicted revenue, actual revenue, and the error associated with the predicted revenue that may be generated in accordance with embodiments of the present disclosure. FIG. 3 is an exemplary plot of predicted revenues vs. actual revenues. In this example, the predicted revenue was based on a training data set of approximately 1.2 million titles or topics, and the actual revenue reflects a test data set of approximately 400,000 topics or titles. The correlation coefficient for this graph is 0.45, while the p-value is less than 0.001.

FIG. 4 depicts revenue errors (y axis) associated with an exemplary selection policy (referred to as ML 2.0 in this example) based on deciles from predicted revenue that may be used by content providers and/or service providers implementing embodiments of the present disclosure. In this example, the revenue errors reflect the difference between the revenue actually generated based on content scored according to the selection policy. A positive error indicates the actual revenue is higher than predicted, with a negative error indicating the actual revenue is lower than predicted. The box biased above the 0-error level is indicative that the model is conservative (i.e., configured to under-predict revenue instead of over-predicting revenue).

Figure 2:
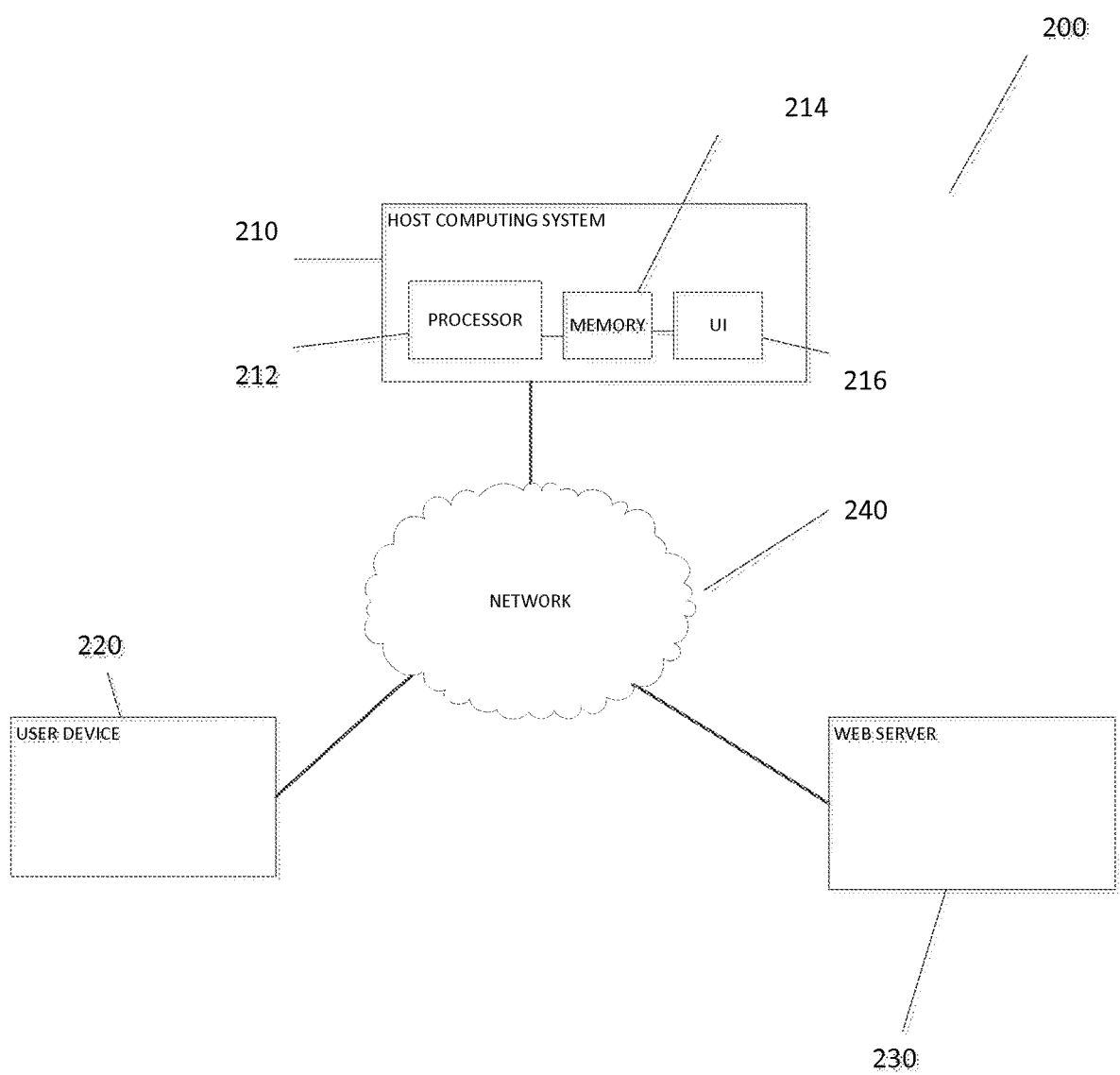
FIG. 2 shows a block diagram of an exemplary system according to various embodiments.

FIG. 2 shows a block diagram of system which may be used in conjunction with various embodiments. While FIG. 2 illustrates various components of a computer system, it is not intended to represent any particular architecture or manner of interconnecting the components. Other systems that have fewer or more components may also be used.

In FIG. 2, the system 200 includes a host computer system 210 comprising a processor 212, memory 214, and user interface 216. Host computer system 210 may include any number of different processors, memory components, and user interface components, and may interact with any other desired systems and devices in conjunction with embodiments of the present disclosure.

The functionality of the host system 210, including the method depicted in FIG. 1, (in whole or in part), may be implemented through the processor 212 executing computer-readable instructions stored in the memory 214 of the system 210. The memory 214 may store any computer-readable instructions and data, including software applications, applets, and embedded operating code.

The functionality of the host system 210 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/ or hardware components. The processor 212 retrieves and executes instructions stored in the memory 214 to control the operation of the system 210. Any type of processor, such as an integrated circuit microprocessor, microcontroller, and/or digital signal processor (DSP), can be used in conjunction with embodiments of the present disclosure. A memory 214 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 214 in any desired manner.

The host system 210 includes a user interface 216 may include any number of input devices (not shown) to receive commands, data, and other suitable input from a user, as well as any number of output devices (not shown) to provides the user with data, notifications, and other suitable information. Typical I/O devices may include mice, keyboards, modems, network interfaces, printers, scanners, video cameras and other devices.

The host system 210 may communicate with one or more user devices 220, one or more web servers 230, and other systems and devices in any desired manner, including via network 240. The user device 220 may include any computing device from which a user enters search terms, interacts with one or more search results (e.g., content hosted on web server 230) or performs any other function in conjunction with systems and methods of the present disclosure. The web server may host one or more web pages that provide search results to the user's device 220, hosts content accessible by the user, collects metrics and information regarding the user's interaction with various content, or performs other functionality in accordance with the embodiments of the present disclosure.

The user device 220 and web server 230 may include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 240 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: shipping data, package data, and/or any data useful in the operation of the system.

Various functionality may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, or any other of the myriad software packages available for browsing the internet.

Various embodiments may operate in conjunction with any suitable operating system (e.g., Windows NT, 95/98/2000/CE/Mobile/, Windows 7/8, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

The various system components may be independently, separately or collectively suitably coupled to a network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that embodiments of the present disclosure may operate in conjunction with any suitable type of network, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may be located at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present invention. These and other changes or modifications are intended to be included within the scope of the present disclosure, as expressed in the following claims.

What is claimed is:
1. A method, comprising:
a computer system communicating over a network with a plurality of web servers and a plurality of user devices;

receiving over the computer network, by the computer system, information from a web server of the plurality of web servers, wherein the information comprises future content to be produced by the web server;

identifying, by the computer system, a topic associated with the information based on one or more of content of websites or data regarding searches performed by users using the plurality of user devices;

receiving from the web server, by the computer system, a plurality of search data sets for a respective plurality of previously-executed searches performed at least via the plurality of user devices, each of the plurality of data sets including one or more links within one or more search results of the respective plurality of previously-executed searches performed at least via the plurality of user devices;

determining, by the computer system for each of the plurality of data sets, a respective similarity score indicative of a level of similarity between the respective search data and the topic, wherein the topic is parsed and analyzed using a part-of speech tagger to identify nouns, verbs, adjectives, and other parts of the topic;

selecting, by the computer system, a subset of search data sets from the plurality of search data sets based on the respective similarity score for each search data set in the subset;

identifying, by the computer system, a first format associated with the topic, wherein the first format comprises a video format type used by the plurality of user devices in displaying content associated with the topic included within one or more of the subset of search data sets;

identifying, by the computer system, a second format associated with the topic, wherein the second format comprises a textual article format type used by the plurality of user devices in displaying content associated with the topic included within one or more of the subset of search data sets;

generating, by the computer system, a first revenue model based on the identified first format and the subset of the search data sets;

generating, by the computer system, a second revenue model based on the identified second format and the subset of the search data sets;

determining, by the computer system, a first score indicative of first predicted revenue generated from the future content of the web server if published in the identified first format associated with the topic using the first revenue model; and determining, by the computer system, a second score indicative of second predicted revenue generated from the future content of the web server if published in the identified second format associated with the topic using the second revenue model.

2. The method of claim 1, wherein determining the first score is based on information regarding a distribution platform from which the future content associated with the topic would be provided.

3. The method of claim 1, further comprising:
determining the first score via a first distribution platform; and
determining the second score via a second distribution platform.

4. The method of claim 2, wherein the distribution platform includes one or more of:
a software application;
a file transfer protocol site;
a web site;
a peer-to-peer network; and
combinations thereof.

5. The method of claim 1, wherein determining the first score is based on information regarding revenue previously generated by other content in the identified first format.

6. The method of claim 5, wherein the information regarding the revenue previously generated by the other content includes information regarding a distribution platform from which the other content was hosted while generating the previous revenue.

7. The method of claim 5, wherein determining the first score is based on a level of similarity between the other content and the future content.

8. The method of claim 1, further comprising:
determining a first score indicative of predicted revenue from providing the future content under a first revenue model; and
determining a second score indicative of predicted revenue from providing the future content under a second revenue model.

9. The method of claim 1, wherein the search data includes search terms.

10. The method of claim 1, wherein the search data includes a title of online content.

11. The method of claim 1, wherein the search data includes metrics related to the previously executed search.

12. The method of claim 11, wherein the metrics include one or more of:
an average position of a search result;
an indicator of a number of times a search result is accessed within a period of time;
a cost associated with providing a search result in relation to a number of times the search result is accessed;
information regarding a user accessing a search result;
information regarding a computing device used by a user accessing a search result;
an age of content associated with a search result;
a ranking of content associated with a search result;
revenue generated by content associated with a search result; and
combinations thereof.

13. The method of claim 1, further comprising:
ranking the subset of search data sets based on the respective similarity score for each search data set in the subset.

14. The method of claim 1, further comprising:
receiving, after the future content is hosted, an indication of first actual revenue generated by the future content if published in the identified first format;
receiving, after the future content is hosted, an indication of second actual revenue generated by the future content if published in the identified second format;
comparing the first actual revenue to the first predicted revenue;
comparing the second actual revenue to the second predicted revenue;
storing first results of the comparison between the first actual revenue and the first predicted revenue; and
storing second results of the comparison between the second actual revenue and the second predicted revenue.

15. The method of claim 14, further comprising:
calculating, based on the stored first results, a first error associated with the first predicted revenue; and
calculating, based on the stored second results, a second error associated with the second predicted revenue.

16. The method of claim 15, further comprising generating a report that includes:
respective indicators of the first and second predicted revenues;
respective indicators of the first and second actual revenues; and
respective indicators of the first and second errors.

17. The method of claim 15, further comprising:
receiving information regarding a second topic;
identifying a first format associated with the second topic, wherein the first format associated with the second topic comprises a video format type used in displaying content associated with the second topic;
determining a third score indicative of third predicted revenue produced from generating, in the identified first format for the content associated with the second topic, second future content associated with the second topic if published in the identified first format associated with the second topic using the first revenue model; and
adjusting the third score based on the first error associated with the first predicted revenue.

18. The method of claim 17, further comprising:
identifying a second format associated with the second topic, wherein the second format associated with the second topic comprises a textual article format type used in displaying content associated with the second topic;
determining a fourth score indicative of fourth predicted revenue produced from generating, in the identified second format for the content associated with the second topic, second future content associated with the second topic if published in the identified second format associated with the second topic using the second revenue model; and
adjusting the fourth score based on the second error associated with the second predicted revenue.

19. A non-transitory, computer-readable medium storing instructions that, when executed, cause a computing device to:
communicate over a network with a plurality of web servers and a plurality of user devices;
receive, over the computer network, information from a web server of the plurality of web servers, wherein the information comprises future content to be produced by the web server;
identify a topic associated with the information based on one or more of content of websites or data regarding searches performed by users using the plurality of user devices;
receive, from the web server, a plurality of search data sets for a respective plurality of previously-executed searches performed at least via the plurality of user devices, each of the plurality of data sets including one or more links within one or more search results of the respective plurality of previously-executed searches performed at least via the plurality of user devices;
determine, for each of the plurality of data sets, a respective similarity score indicative of a level of similarity between the respective search data and the topic, wherein the topic is parsed and analyzed using a part-of speech tagger to identify nouns, verbs, adjectives, and other parts of the topic;
select a subset of search data sets from the plurality of search data sets based on the respective similarity score for each search data set in the subset;
identify a first format associated with the topic, wherein the first format comprises a video format type used by the plurality of user devices in displaying content associated with the topic included within one or more of the subset of search data sets;
identify a second format associated with the topic, wherein the second format comprises a textual article format type used by the plurality of user devices in displaying content associated with the topic included within one or more of the subset of search data sets;
generate a first revenue model based on the identified first format and the subset of the search data sets;
generate a second revenue model based on the identified second format and the subset of the search data sets;
determine a first score indicative of first predicted revenue generated from the future content of the web server if published in the identified first format associated with the topic using the first revenue model; and
determine a second score indicative of second predicted revenue generated from the future content of the web server if published in the identified second format associated with the topic using the second revenue model.

20. A system comprising:
at least one processor; and
memory in communication with the at least one processor and storing instructions that, when executed by the processor, cause the system to:
communicate over a network with a plurality of web servers and a plurality of user devices;
receive, over the computer network, information from a web server of the plurality of web servers, wherein the information comprises future content to be produced by the web server;
identify a topic associated with the information based on one or more of content of websites or data regarding searches performed by users using the plurality of user devices;
receive, from the web server, a plurality of search data sets for a respective plurality of previously-executed searches performed at least via the plurality of user devices, each of the plurality of data sets including one or more links within one or more search results of the respective plurality of previously-executed searches performed at least via the plurality of user devices;
determine, for each of the plurality of data sets, a respective similarity score indicative of a level of similarity between the respective search data and the topic, wherein the topic is parsed and analyzed using a part-of speech tagger to identify nouns, verbs, adjectives, and other parts of the topic;
select a subset of search data sets from the plurality of search data sets based on the respective similarity score for each search data set in the subset;
identify a first format associated with the topic, wherein the first format comprises a video format type used by the plurality of user devices in displaying content associated with the topic included within one or more of the subset of search data sets;
identify a second format associated with the topic, wherein the second format comprises a textual article format type used by the plurality of user devices in displaying content associated with the topic included within one or more of the subset of search data sets;
generate a first revenue model based on the identified first format and the subset of the search data sets;

generate a second revenue model based on the identified second format and the subset of the search data sets;

determine a first score indicative of first predicted revenue generated from the future content of the web server if published in the identified first format associated with the topic using the first revenue model; and determine a second score indicative of second predicted revenue generated from the future content of the web server if published in the identified second format associated with the topic using the second revenue model.

* * * * *